No. 879,323. PATENTED FEB. 18, 1908.
J. W. ROSS.
MEANS FOR RELEASING AND LEADING ANIMALS FROM STABLES.
APPLICATION FILED MAY 15, 1907.
2 SHEETS—SHEET 1.
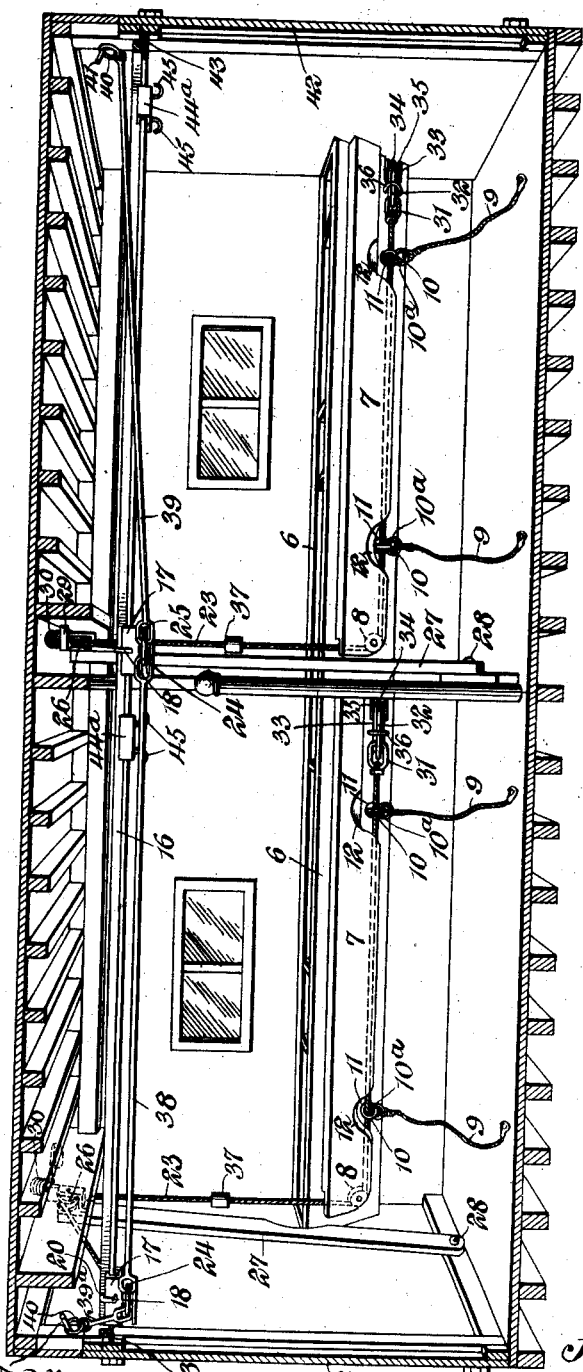
James W. Ross, Inventor, No. 879,323.
J. W. ROSS.
PATENTED FEB. 18, 1908.
MEANS FOR RELEASING AND LEADING ANIMALS FROM STABLES.
APPLICATION FILED MAY 15, 1907.
2 SHEETS—SHEET 2.
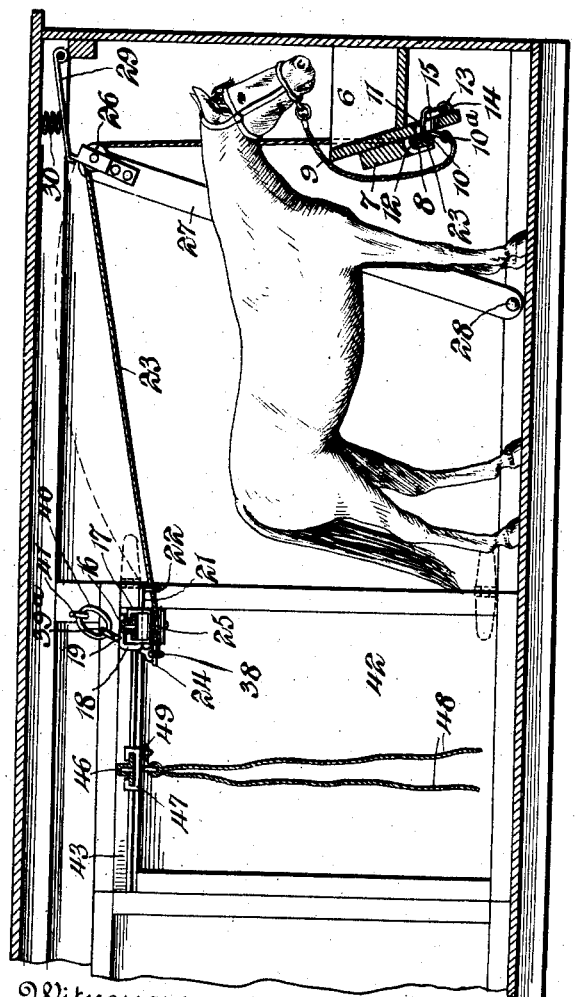
Witnesses
Howard D. Orr
B. G. Foster
Inventor,
James W. Ross,
By E. G. Siggers
Attorney

UNITED STATES PATENT OFFICE.

JAMES W. ROSS, OF SPENCER, NEBRASKA.

MEANS FOR RELEASING AND LEADING ANIMALS FROM STABLES.

No. 879,323.   Specification of Letters Patent.   Patented Feb. 18, 1908.

Application filed May 15, 1907. Serial No. 373,794.

*To all whom it may concern:*

Be it known that I, JAMES W. ROSS, a citizen of the United States, residing at Spencer, in the county of Boyd and State of Nebraska, have invented a new and useful Means for Releasing and Leading Animals from Stables, of which the following is a specification.

This invention relates to mechanism for releasing animals secured in stables and leading them therefrom, and also for drawing harness, vehicles, and the like from such stable in case of fire or other danger. It is well known that horses become panic stricken in the presence of fire, and mechanism of this nature must be promptly effective, and so arranged and constructed that no involved or complicated manipulations are necessary as otherwise said mechanism might be of little use in the hands of an excited operator and struggling horses.

The primary object of the present invention therefore is to produce mechanism of this character that will not in any manner interfere with the ordinary use of the stable, but will at all times be in condition to be immediately operated, the mechanism moreover being such that upon the operation of a single part, the animal or animals will be automatically released and then led from the stable, said mechanism moreover being freely operable in opposite directions.

While the invention can be embodied in a number of ways, as will be evident from an inspection of the claims, the preferred form of construction is disclosed in the accompanying drawings, wherein:—

Figure 1 is a sectional perspective view of the interior of a stable, showing two stalls, and the improved mechanism therein. Fig. 2 is a horizontal sectional view through the mangers. Fig. 3 is a vertical cross sectional view through the stable. Fig. 4 is a vertical longitudinal sectional view through the manger, showing the locking bolts for the halters. Fig. 5 is a cross sectional view through one of the carriages, showing the locking mechanism therefor and illustrating the manner in which the carriage is unlocked.
Fig. 6 is a sectional view on the line 6—6 of Fig. 5.

Similar reference numerals designate corresponding parts in all the figures of the drawings.
While two stalls are shown, it will be evident that any number may be employed, as desired, and as the mechanism in both stalls is the same, a description of one will be sufficient for both. Each stall is provided with a manger 6, on the front wall of which is mounted a guard-board or plate 7, at one end of which is located a guide pulley 8. Halters 9, which may be of any suitable construction, are secured to rings 10ª that are in turn engaged in links 10 which pass through openings 11 formed in the front wall of the manger, the guard plate 7 being cut away, as shown at 12. A locking bolt 13 is slidably mounted in guide-ways 14 on the rear side of the front wall of the manger below the bottom thereof, and has fingers 15 that detachably engage the links 10, as clearly shown in Figs. 2 and 3. Thus it will be evident that the halters are secured in place, but can be released by sliding the bolt 13 in the direction to disengage the fingers 15 from the links 10.

A track or guide 16 is mounted in the upper portion of the stable in rear of the stalls, and has its ends disposed at the opposite door-ways. Slidably mounted on this track or guide, is a carriage 17, which, however, is normally held against its sliding movement by a locking bolt 18, slidably mounted on the carriage and having a finger 19 that engages in a notch 20 in the track. This locking bolt has a rearwardly extending stem 21 provided with a terminal downturned eye 22. A leading cable 23 having a ring 24 at its outer end, passes between spaced pulleys 25 journaled on the carriage and through the terminal eye 22 of the locking bolt. Said cable passes over a pulley 26 journaled on the upper end of a swinging arm 27 located at one side of the stall, and having its lower end pivotally mounted, as shown at 28. The upper end of the arm 27 is normally located at the upper inner corner of the stall, as shown in Fig. 3, where it is held by a downwardly swinging latch 29 yieldingly urged into engagement therewith by a spring 30. The leading cable 23 passes downwardly from the pulley 26 around the guide pulley 8, and through the links 10 of the halters. Said cable thus has its inner portion disposed longitudinally along the front wall of the manger 6, and partially covered by the guard 7. Its inner terminal is provided with a ring or link 31, detachably engaged by a swinging hook 32 pivoted upon a link 33 that has a flexible cable connection 34 with one end of the locking bolt 13, said cable connection passing about a pulley 35 journaled in the front wall of the manger. The hook 32 is normally prevented from swinging by having its free end slidably mounted in a keeper staple or eye 36 secured to the front wall of the manger, the link 33 also passing through the keeper 36.

Mounted on the upwardly extending portion of the leading cable 23 is a button 37, which button engages the latch 29 upon the outward movement of the cable 23, and raises said latch to disengage it from the arm 27. The arm 27, when freed from the latch, is arranged to swing outwardly, and when so swung, will engage the eye 22 of the locking bolt 18, thereby moving said bolt to a position so that it is disengaged from the track 20, as will be clear by reference to Figs. 3 and 5. The rings 24 of the different leading cables are connected by links 38, as shown in Fig. 1, and the outermost rings have links 39 and 39$^a$ connected thereto, which links are provided with rings 40 detachably hung upon pins 41 arranged adjacent to the doors 42 at the ends of the stable. These doors are hinged in any suitable manner, and preferably carry on their upper ends track sections 43, which are arranged to aline with the main guide or track 16 when the doors are swung outwardly. The locking bolts 13 of the various stalls may also be connected by links, as 44, though this is not absolutely necessary. It is desirable, however, inasmuch as it insures the operation of all the bolts.

The operation of the mechanism may be briefly described as follows:—Under ordinary conditions, the parts are, as shown in the drawings, in which case the halters 9 will be securely fastened to the mangers. If, however, in case of fire or other imminent danger, it becomes necessary to quickly free and lead the animals from the stable, it is only necessary to disengage either of the terminal rings from its supporting pin 41 and draw the same outwardly through one of the door-ways either by hand or suitable power mechanism, as a windlass whereupon the opposite terminal link will slip from its supporting pin, as will be evident. Upon such movement, it will be evident that the leading cables 23 will be drawn and the first action of said cables will be to slide the bolts 13, so that the fingers 15 thereof will disengage from the links 10. The halters are thus released from the holding means. As soon as the bolts are disengaged from the links, the free ends of the hooks 32 will become disengaged from their keepers 36, consequently permitting said hooks to swing, and the terminal rings 31 of the leading cables will be detached from the locking bolts. As the leading cables 23 continue to move, it will be evident that the links 10 will be collected thereupon, and the halters will thus be drawn to the corners of the stalls, in which the guide pulleys 8 are located. At the same time, the cables can freely disengage from said pulleys 8. During the latter movement, the buttons 37 will unlock the swinging arms 27, and thus release said arms, so that they will swing outwardly toward the carriages and unlock the same. Moreover when said buttons ride over the pulleys 26, the cables 23 will readily disengage from said pulleys. Consequently as the links 38—39 or 39$^a$ are moved outwardly, the carriages 17 will move along the tracks or guides, and on to the track sections 43, so that the animals will be led from the stable. It will thus be seen that the releasing and leading of the animals depends solely upon the operation of a single part, namely, the pulling of either of the links 40, and the operation is thus so greatly simplified that it cannot be misunderstood by an operator even under the excitement incident to a conflagration.

Preferably associated with each of the carriages constituting part of the leading means, is another carriage 44$^a$ located on the track or guide 16, and having suitable hanger hooks 45 upon which the harnesses of the animals may be hung, these carriages being disposed in the path of movement of the carriages 17 and being moved thereby along the track so that the harnesses can also be saved. Moreover, means are preferably provided for drawing vehicles, and the like from the stable. While this means may be of any suitable character, preferably another track 46 is employed, having carriages 47, to which the vehicles are connected by cables, as 48. These latter carriages having suitable means, as cables 49 for moving them.

From the foregoing, it is thought that the construction, operation, and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In mechanism of the character set forth, the combination with a halter, of a locking device therefor, a leading device for the halter having a limited sliding engagement therewith and constituting operating means for the locking device, and a detachable connection between the end of the leading device and the locking device that automatically releases the leading device from such locking device after the latter has been operated by the former.

2. In mechanism of the character set forth, the combination with a halter having a ring, of a locking device detachably engaging the ring, a leading cable slidably passing through the ring and constituting operating means for the locking device, and a detachable connection between the end of the cable and the locking device that automatically releases the cable from said locking device after the latter has been operated by the former to release the halter ring.

3. In mechanism of the character set forth, the combination with a halter locking device, of a device for operating the locking device, and a detachable connection between the devices, said connection comprising a link carried by one device, a swinging hook carried by the other device and detachably engaging in the link, and a stationary keeper in which the hook is slidably engaged and from which it disengages to permit the swinging movement thereof and the consequent detachment of the hook from the link on the operation of the locking device by the operating device.

4. In mechanism of the character set forth, the combination with a halter locking device, of a device for operating the locking device, a link carried by the operating device, a swinging hook connected to the locking device and detachably engaging in the link, and a stationary keeper in which the hook is slidably engaged and from which its free end disengages to permit the swinging movement thereof and the consequent detachment of the hook from the link.

5. In mechanism of the character set forth, the combination with a halter having a ring, of a locking device for the halter detachably engaging in the ring, a leading cable slidably passing through the ring, a cable connected to the locking device, a ring carried by one of the cables, a swinging hook connected to the other cable and detachably engaging in the ring, and a stationary keeper in which the end of the hook is normally engaged and from which it detaches upon the movement of the leading cable to permit the swinging movement of the hook and the consequent disengagement of the same from the ring.

6. In mechanism of the character described, the combination with a movable halter holding device and operating means therefor, of a detachable connection between the device and means, including a swinging hook pivotally mounted on one and detachably engaging the other, and a keeper in which said hook moves and from which it disengages.

7. In mechanism of the character set forth, the combination with a manger having a front wall with an opening therethrough, of a halter ring that detachably engages in the opening, a sliding bolt on the inner side of the wall that detachably engages in the ring, a leading cable extending along the outer side of the wall and slidably passing through the ring, a cable connected to the bolt, and detachable connections between the cables.

8. In mechanism of the character described, the combination with a slidable halter holding bolt, and an operating cable therefor, of a hook having a flexible connection with the bolt and a detachable engagement with the cable, and a keeper loop in which the free end of the hook is slidably engaged and from which it disengages upon the sliding movement of said hook and the corresponding movement of the bolt.

9. In mechanism of the character set forth, the combination with a manger, of a halter ring, a sliding bolt mounted on the manger and detachably engaging in the ring, a leading cable slidably passing through the ring and having a terminal link, a cable connected to the bolt, a swinging hook mounted on the latter cable and detachably engaging in the terminal link of the leading cable, and a stationary keeper mounted on the manger, the free end of the swinging hook normally engaging in the keeper and disengaging from the same upon the movement of the leading cable.

10. In mechanism of the character described, the combination with a halter, of a movable halter holding device, leading means connected to the halter and constituting operating means for the holding device, and a detachable connection between the holding device and said leading means, including a swinging hook carried by one and detachably engaging the other, and a keeper in which said hook moves and from which it automatically disengages.

11. In mechanism of the character described, the combination with a halter, of a sliding bolt for holding the halter, a cable having a movable connection with the halter and constituting operating means for the bolt, and a detachable connection between the cable and the bolt, including a swinging hook that automatically swings to inoperative position after the bolt has been operated.

12. In mechanism of the character described, the combination with a halter having a link, of a slidable holding bolt that detachably engages the link, a leading cable passing through the link, a guide pulley, a flexible device connected to the bolt and passing around the pulley, a hook carried by said flexible device and having a detachable engagement with the leading cable, and a keeper in which said hook slides and from which it disengages.

13. In mechanism of the character described, the combination with a stall and manger, of an animal leading cable extending longitudinally of the manger, a guide at one end of the manger, and another guide in the upper portion of the stall, said cable detachably passing over the guides.

14. In mechanism of the character described, the combination with a stall, of a guide mounted in the stall and movable from the inner to the outer portion thereof, and an animal leading device that movably engages the guide.

15. In mechanism of the character set forth, the combination with a stall, of a guide mounted in the stall and movable from the inner to the outer portion thereof, an automatic lock for holding the guide in its inner position, and an animal leading device that movably engages the guide.

16. In mechanism of the character set forth, the combination with a stall, of a guide mounted in the stall and movable from the inner to the outer portion thereof, an automatic lock for holding the guide in its inner position, and an animal leading device that detachably engages the guide, said leading device constituting operating means for moving the lock to release the guide.

17. In mechanism of the character set forth, the combination with a stall, of a guide mounted in the stall and movable from the inner to the outer portion thereof, a spring pressed latch that engages the guide to hold it against movement, and an animal leading device that movably engages the guide, said leading device constituting operating means for moving the latch to release the guide.

18. In mechanism of the character set forth, the combination with a stall, of a swinging guide mounted in the stall and movable from the inner to the outer portion thereof, and an animal leading device that movably engages the guide.

19. In mechanism of the character set forth, the combination with a stall, of a swinging arm mounted in the stall and movable from an inner to an outer position therein, a pulley journaled on the arm, and a leading cable movably mounted in the stall and passing over the pulley.

20. In mechanism of the character set forth, the combination with a stall, of a swinging arm pivoted at its lower end to one side of the stall and having its upper end movable from an inner to an outer position in said stall, a pulley journaled on the upper end of the arm, a latch for normally holding the arm in its inner position, and a leading cable passing over the pulley and having a device thereon that engages the latch to move the same, and thereby release the arm to permit its swinging movement.

21. In mechanism of the character described, the combination with a stall having a manger, of a swinging arm mounted in the manger and having a pulley, a latch for holding the arm against its swinging movement, a halter having a link, a sliding bolt mounted on the manger and detachably engaging in the link, a leading cable passing over the pulley of the arm and through the halter link, a device on said cable that engages the latch to move the same and thereby release the arm, and an automatic detachable connection between the cable and the bolt.

22. In mechanism of the character set forth, the combination with a track or guide, of a carriage movably mounted thereon, a lock for holding the carriage against movement on the track or guide, and animal leading means movably associated with the carriage and constituting automatic means for operating the lock to release and permit the movement of the carriage.

23. In mechanism of the character set forth, the combination with a track or guide, of a carriage movably mounted thereon, a lock for holding the carriage against movement on the track or guide, animal leading means associated with the carriage, and means controlled by the movement of said leading means for operating the lock to release and permit the movement of the carriage.

24. In mechanism of the character set forth, the combination with a track or guide, of a carriage movably mounted thereon, a lock for holding the carriage against movement on the track or guide, animal leading means associated with the carriage, and a movable guide associated with the leading means and constituting means for operating the lock to release and permit the movement of the carriage.

25. In mechanism of the character set forth, the combination with a track or guide, of a carriage movably mounted thereon, a holding device movably mounted on the carriage and detachably interlocked with the track, animal leading means movably associated with the carriage, and means controlled by the movement of said leading means for operating the holding device to release and permit the movement of the carriage.

26. In mechanism of the character set forth, the combination with a track or guide, of a carriage slidably mounted thereon, a lock for holding the carriage against its sliding movement on the track or guide, a leading cable movably engaged with the carriage, and a swinging guide arm associated with the leading cable and movable to a position to engage the lock and release the carriage to permit the movement of said carriage on the track or guide.

27. In mechanism of the character set forth, the combination with a track or guide, of a carriage movably mounted thereon, a lock movably mounted on the carriage and engaging the track or guide, to hold said carriage against movement, a swinging arm movable into engagement with the lock to release the carriage, a latch for holding the arm against movement, and a leading cable movably mounted on the carriage and on the arm, said cable having a device that engages the latch to release the arm and thereby permit it to move the lock of the carriage.

28. In mechanism of the character set forth, the combination with a stall and manger, of a halter, a link secured to the halter, a locking bolt that engages in the link, a swinging arm, a pulley journaled on the arm, a latch that engages the arm to prevent its swinging movement, a track or guide, a carriage slidably mounted thereon, a lock for holding the carriage against movement on the track or guide, said lock being operated by the arm on its swinging movement, a leading cable movably engaged with the carriage, said cable passing over the pulley of the arm and through the link of the halter, a device mounted on the leading cable and engaging the latch of the arm to move the same and thereby release said arm, and a detachable connection between the leading cable and the bolt, comprising a swinging hook connected to one and detachably engaged with the other, and means for normally holding the hook against its swinging movement until after the operation of the locking bolt.

29. In mechanism of the character set forth, the combination with a plurality of animal holding devices, of a single leading device having a slidable engagement with the holding devices, locking means for the holding devices, and a detachable connection between the leading device and locking means that automatically releases the former from the latter upon a predetermined movement thereof.

30. In mechanism of the character set forth, the combination with a plurality of halter rings, of a single leading cable slidably passing through the different rings, locking means engaging the different rings, and a detachable connection between the cable and locking means that automatically releases the former from the latter when said locking means has been disengaged from the rings.

31. In mechanism of the character set forth, the combination with a stable having a plurality of exits, of animal holding means located in the stable, a locking device for the holding means, and leading means for said holding means movable in opposite directions to carry the same through either exit, said leading means when operated in either direction, also constituting means for effecting the release of the holding means from the locking means.

In testimony, that I claim the foregoing as my own, I have hereto affixed my signature in the presence of two witnesses.

JAMES W. ROSS.

Witnesses:
  WILLIAM C. KELLEY,
  C. A. GRAY.